US011012246B2

(12) United States Patent
Lu et al.

(10) Patent No.: US 11,012,246 B2
(45) Date of Patent: May 18, 2021

(54) SRAM-BASED AUTHENTICATION CIRCUIT

(71) Applicant: Taiwan Semiconductor Manufacturing Co., Ltd., Hsin-Chu (TW)

(72) Inventors: Shih-Lien Linus Lu, Hsinchu (TW); Wei-Min Chan, Sindian (TW); Chien-Chen Lin, Kaohsiung (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 854 days.

(21) Appl. No.: 15/259,948

(22) Filed: Sep. 8, 2016

(65) Prior Publication Data

US 2018/0069711 A1    Mar. 8, 2018

(51) Int. Cl.
| | | |
|---|---|---|
| *H04L 9/32* | (2006.01) | |
| *G11C 7/20* | (2006.01) | |
| *G11C 8/12* | (2006.01) | |
| *H04L 9/08* | (2006.01) | |
| *G06F 12/14* | (2006.01) | |
| *G11C 11/417* | (2006.01) | |
| *G11C 29/14* | (2006.01) | |
| *G11C 16/34* | (2006.01) | |
| *G11C 29/44* | (2006.01) | |

(52) U.S. Cl.
CPC ........ *H04L 9/3278* (2013.01); *G06F 12/1408* (2013.01); *G11C 7/20* (2013.01); *G11C 8/12* (2013.01); *G11C 11/417* (2013.01); *H04L 9/0866* (2013.01); *H04L 9/3247* (2013.01); *G06F 2212/1052* (2013.01); *G06F 2212/402* (2013.01); *G11C 2029/4402* (2013.01)

(58) Field of Classification Search
CPC . H04L 9/3278; H04L 9/3247; G06F 12/1408; G06F 2212/1052; G06F 2212/402; G11C 11/417
See application file for complete search history.

(56) References Cited

U.S. PATENT DOCUMENTS

| | | |
|---|---|---|
| 8,605,523 B2 | 12/2013 | Tao et al. |
| 8,630,132 B2 | 1/2014 | Cheng et al. |
| 8,760,948 B2 | 6/2014 | Tao et al. |

(Continued)

OTHER PUBLICATIONS

Selimis et al "Evaluation of 90nm 6T-SRAM as Physical Unclonable Function for Secure Key Generation in Wireless Sensor Nodes," Proceedings of IEEE International Symposium on Circuits and Systems, pp. 567-570, Aug. 3, 2011 (Year: 2011).*

*Primary Examiner* — Luu T Pham
*Assistant Examiner* — James J Wilcox
(74) *Attorney, Agent, or Firm* — Duane Morris LLP

(57) ABSTRACT

A memory device includes a memory block comprises a plurality of bits, wherein at least a first bit of the plurality of bits presents an initial logic state each time it is powered on; a start-up circuit configured to power on and off the memory block N times, where N is an odd integer greater than 1, and wherein the at least first bit presents an initial state after each respective power cycle of the memory block; and an authentication circuit, coupled to the memory block, and comprising an election engine that is configured to elect an initial state that occurs (N+1)/2 or more times after N power cycles that are performed by the start-up circuit, as a majority initial logic state for the first bit.

20 Claims, 6 Drawing Sheets

(56) References Cited

U.S. PATENT DOCUMENTS

| | | | |
|---|---|---|---|
| 8,880,954 B2* | 11/2014 | Gebara | G06F 21/44 714/42 |
| 8,908,421 B2 | 12/2014 | Liaw | |
| 8,929,160 B2 | 1/2015 | Katoch et al. | |
| 8,964,492 B2 | 2/2015 | Hsu et al. | |
| 8,982,643 B2 | 3/2015 | Lum | |
| 9,117,510 B2 | 8/2015 | Yang et al. | |
| 9,208,858 B1 | 12/2015 | Lin et al. | |
| 9,218,872 B1 | 12/2015 | Liaw | |
| 9,584,329 B1* | 2/2017 | Trimberger | H04L 9/3278 |
| 9,608,827 B1* | 3/2017 | Trimberger | G06F 21/44 |
| 9,712,166 B2* | 7/2017 | Tanamoto | G09C 1/00 |
| 9,934,411 B2* | 4/2018 | Kwong | H04L 9/3278 |
| 2001/0021131 A1* | 9/2001 | Kitazawa | G11C 11/406 365/200 |
| 2003/0026161 A1* | 2/2003 | Yamaguchi | G11C 7/1006 365/230.03 |
| 2006/0268622 A1* | 11/2006 | Kang | G11C 14/00 365/185.23 |
| 2007/0263443 A1* | 11/2007 | Crook | G11C 11/412 365/185.08 |
| 2007/0268752 A1* | 11/2007 | Kang | G11C 14/0063 365/185.23 |
| 2013/0147511 A1* | 6/2013 | Koeberl | H04L 9/3263 326/8 |
| 2013/0247145 A1* | 9/2013 | Gebara | G06F 21/73 726/2 |
| 2013/0250643 A1* | 9/2013 | Matsunaga | G11C 8/12 365/63 |
| 2014/0153345 A1 | 6/2014 | Kim et al. | |
| 2014/0218067 A1* | 8/2014 | Li | G09C 1/00 326/8 |
| 2014/0233330 A1 | 8/2014 | Ko et al. | |
| 2015/0058928 A1* | 2/2015 | Guo | H04L 63/0876 726/3 |
| 2015/0117080 A1* | 4/2015 | Matsunaga | G11C 5/02 365/63 |
| 2015/0207624 A1* | 7/2015 | Laver | H04L 9/0866 713/2 |
| 2015/0340090 A1* | 11/2015 | Ma | G11C 13/0061 365/148 |
| 2015/0348598 A1 | 12/2015 | Wang et al. | |
| 2015/0371702 A1 | 12/2015 | Wu et al. | |
| 2015/0380077 A1 | 12/2015 | Wu et al. | |
| 2015/0380078 A1 | 12/2015 | Liaw | |
| 2016/0149712 A1* | 5/2016 | Guo | H04L 63/0884 713/168 |
| 2016/0342777 A1* | 11/2016 | Sadhasivan | H04L 63/061 |
| 2017/0017808 A1* | 1/2017 | Kwong | G11C 29/50012 |
| 2019/0221254 A1* | 7/2019 | Liu | G06F 21/45 |

* cited by examiner

SRAM-BASED AUTHENTICATION CIRCUIT

BACKGROUND

With the increasing use of integrated circuits in electronic devices that provide different types of information for a variety of different applications, there has been an increasing need to adequately protect sensitive and/or critical information that may be stored within an electronic device to limit access to such information to only other devices that have permission to access the information. Some examples of applications include the authentication of devices, protection of confidential information within a device, and securing a communication between two or more devices.

A physically unclonable function (PUF) is a physical structure generally within an integrated circuit that provides a number of corresponding outputs (e.g., responses) in response to inputs (e.g., challenges/requests) to the PUF. Each PUF provides one or more sets of request-response pairs. An identity of the integrated circuit may be established by such request-response pairs provided by the PUF. With the establishment of the identity, secure communication can be provided between devices. The PUF can also be used for existing authentication purposes to replace the current method of assigning an identity to an electronic device. Since the PUF is based on intrinsic properties of a manufacturing process, the PUF has various advantages over conventional authentication approaches that inscribes an identity on a device which may be mimicked and/or reverse engineered more easily.

BRIEF DESCRIPTION OF THE DRAWINGS

Aspects of the present disclosure are best understood from the following detailed description when read with the accompanying figures. It is noted that various features are not necessarily drawn to scale. In fact, the dimensions of the various features may be arbitrarily increased or reduced for clarity of discussion.

DETAILED DESCRIPTION OF EXEMPLARY EMBODIMENTS

Figure 1:
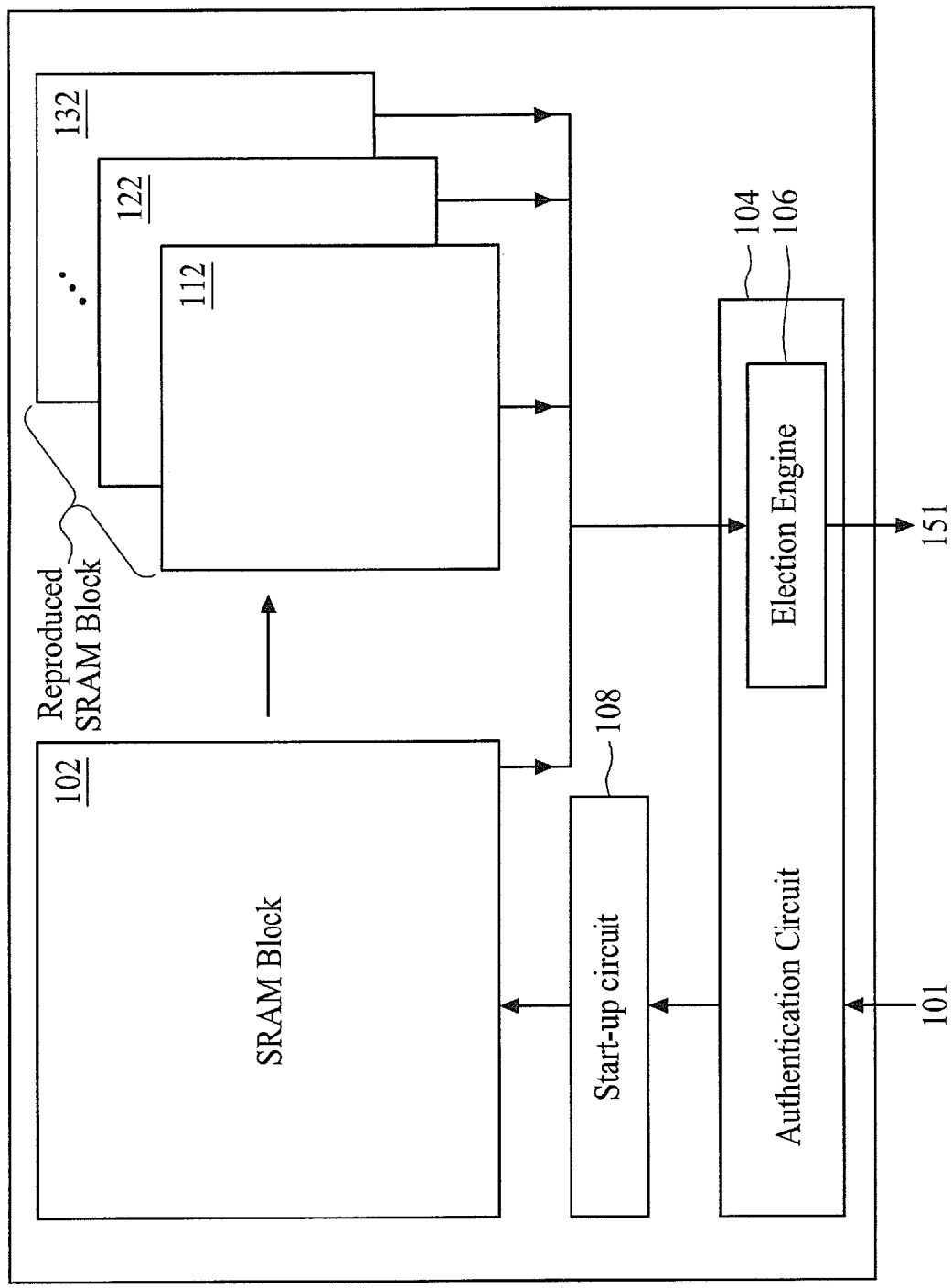
FIG. 1 illustrates an exemplary block diagram of a memory device that includes an election engine, in accordance with some embodiments.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

A physically unclonable function (PUF) is generally used for authentication and secret key storage without requiring secure electrically erasable programmable read-only memory (EEPROMs) and/or other expensive hardware (e.g., battery-backed static random-access memory). Instead of storing secrets in a digital memory, the PUF derives a secret from physical characteristics of an integrated circuit (IC). The PUF is based on an idea that even though an identical manufacturing process is used to fabricate a plurality of IC's, each IC may be slightly different due to manufacturing variability. PUF's leverage this variability to derive "secret" information that is unique to each of the ICs (e.g., a silicon "biometric"). Generally, such secret information is referred to as a "signature" of the IC. In addition, due to the manufacturing variability that defines the signature, one cannot manufacture two identical IC's even with full knowledge of the IC's design. Various types of variability of an IC can be used to define such a signature such as, for example, gate delay(s), threshold voltage(s), power-on state(s) of a static random-access memory (SRAM) device, and/or any of a variety of physical characteristics of an IC.

In the example of using the power-on state(s) of a static random-access memory (SRAM) device provided above, even though an SRAM device includes symmetric cells (bits), manufacturing variability may still cause each bit of the SRAM device to tend to be at a high state (i.e., a logic "1") or at a low state (i.e., a logic "0") every time the SRAM device is powered on. Such a power-on state is referred to as an "initial state" of the bit, hereinafter.

Such initial states of the bits are randomly distributed across the whole SRAM device, which gives rises to a variability that can be defined by a PUF to produce an unique signature of the SRAM device. Generally, generating a PUF signature by using the initial state(s) of an SRAM device is referred to as a "power-on SRAM-based PUF."

In accordance with various embodiments of the present disclosure, bits of an SRAM device are generally constituted of an amount of stable bits and a complementary amount of unstable bits. A stable bit typically presents a consistent initial state even though the SRAM device is powered on and off many times. That is, the initial state of the stable bit is repeatable. On the other hand, an unstable bit typically presents a different initial state every time the SRAM device is powered on. For example, the unstable bit presents a logic 0 when the SRAM device is initially powered on, and may present a logic 1 when the SRAM device is powered off and subsequently powered on again. That is, the initial state of the unstable bit is non-repeatable.

Typically, the power-on SRAM-based PUF is directed to using the initial states of the stable bits in the SRAM device in order to obtain a reliable and repeatable PUF signature. However, since stable bits and unstable bits are randomly distributed across the whole SRAM device, one or more further processes (and corresponding circuit(s)) are generally used to filter out the unstable bits in the SRAM device to generate a reliable PUF signature, which may disadvantageously cause a variety of issues such as, for example, real estate in fabricating an SRAM device, power consumption to operate an SRAM device, etc.

Embodiments of the present disclosure provide various systems and methods to "elect" or "vote" to assign a majority initial state of each unstable bit in a SRAM device to generate a PUF signature without compromising reliability and repeatability of the generated PUF signature. More specifically, the disclosed systems and methods in current embodiments use an election engine of an authentication circuit, which will be described in detail below, to elect the majority initial state of each unstable bit. Moreover, the disclosed systems and methods in current embodiments provide a start-up circuit that may be used in conjunction with the election engine to assure that the SRAM device is fully discharged before being powered on again so as to reinforce the reliability and repeatability of the generated PUF signature.

FIG. 1 illustrates a memory device 100 in accordance with various embodiments. In the illustrated embodiment of FIG. 1, the memory device 100 includes an SRAM block 102, an authentication circuit 104 coupled to the SRAM block 102, which includes an election engine 106, a start-up circuit 108 coupled between the SRAM block 102 and the authentication circuit 104, and one or more reproduced SRAM blocks (112, 122, 132, etc.). Although the authentication circuit 104 is illustrated as a separate component from the SRAM block 102 in the illustrated embodiment of FIG. 1, in some embodiments, the authentication circuit 104 may be integrated or embedded in the SRAM block 102 while remaining within the scope of the present disclosure.

As shown in FIG. 1, the election engine 106 is coupled to the SRAM block 102 and the one or more reproduced SRAM blocks (112, 122, 132, etc.). In accordance with some embodiments, the election engine 106 of the authentication circuit 104 is configured to select a majority initial state of each bit of the SRAM block 102 by comparing each bit's initial state present in the SRAM block 102 and copied into the one or more reproduced SRAM blocks (112, 122, 132, etc.), which will be discussed in further detail below. According to some embodiments of the present disclosure, the authentication circuit 104 is configured to generate a PUF signature for the SRAM block 102 by using the majority initial state of each bit of the SRAM block 102. In some embodiments, the authentication circuit 104 includes an input port 101 configured to receive a request/challenge and an output port 151 configured to provide a response (e.g., a PUF signature) in response to the request. Some examples of the request/challenge may include, but is not limited to, a request to power on the coupled SRAM block 102, a request to access confidential information of the SRAM block 102, etc. In some embodiments, the output port 151 may be directly coupled to the election engine 106.

In accordance with various embodiments, each of the one or more reproduced SRAM blocks 112, 122, and 132 has a substantially similar configuration to the SRAM block 102. For example, each of the reproduced SRAM blocks 112, 122, and 132 and the SRAM block 102 have an identical number of bits and an identical layout of the bits, i.e., a one-to-one mapping, which will be described in further detail below with respect to FIG. 3.

Referring still to FIG. 1, the start-up circuit 108 is configured to iteratively power on and off the SRAM block 102 plural times so as to allow the authentication circuit 104 to generate plural sets of initial states to be present/stored in the plural reproduced SRAM blocks (112, 122, 132, etc.), respectively. The start-up circuit 108 in the disclosed embodiments provides one or more discharging paths to assure charges on parasitic capacitor(s) of the SRAM block 102 will be fully discharged for each iteration of powering on and off. Operations of the start-up circuit 108 will be discussed in further detail below with respect to FIG. 4.

Figure 2:
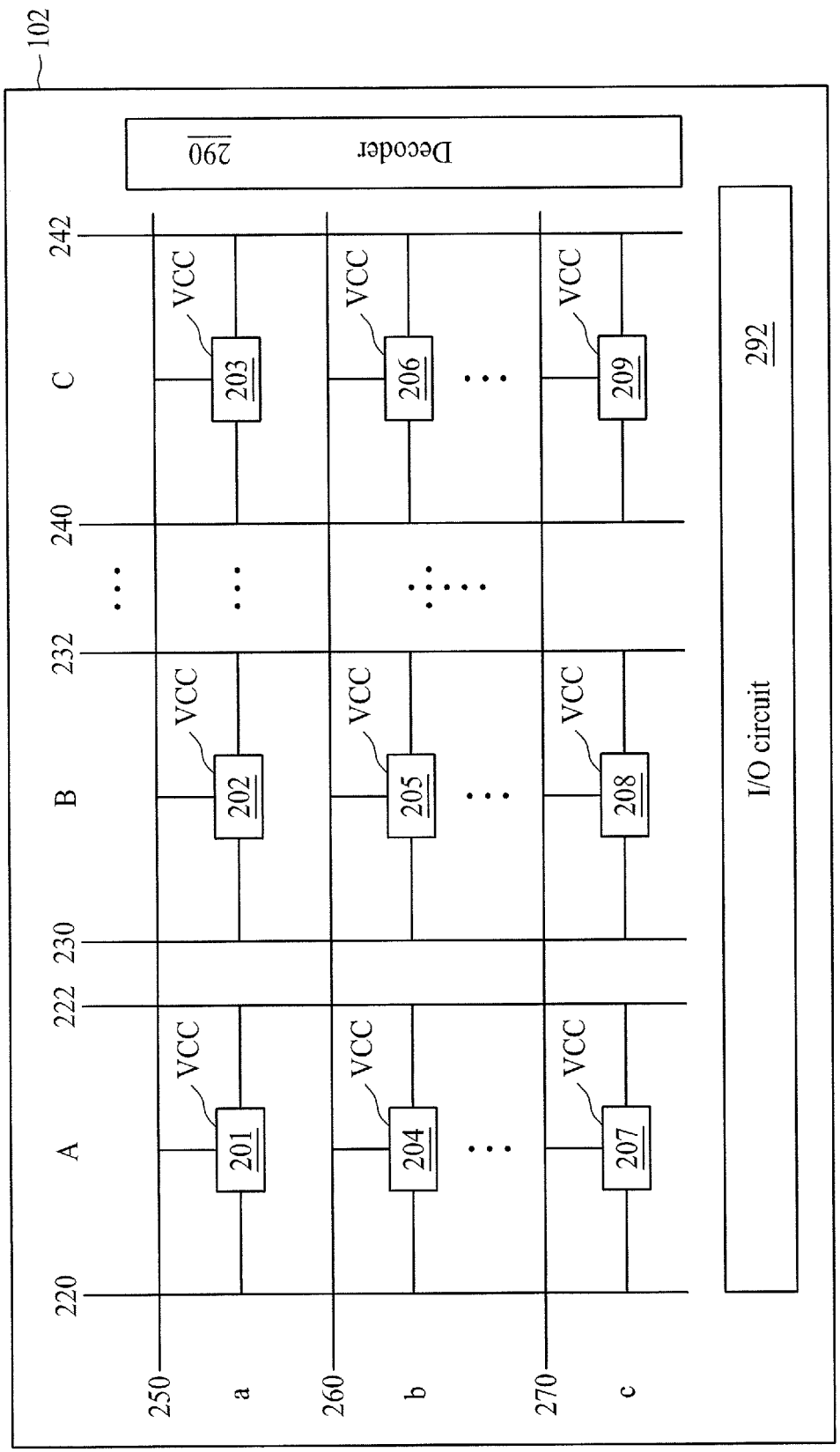
FIG. 2 illustrates an exemplary schematic diagram of a static random-access memory (SRAM) block of the memory device in FIG. 1, in accordance with some embodiments.

FIG. 2 illustrates an exemplary schematic diagram of an embodiment of the SRAM block 102. As illustrated, the SRAM block 102 includes a plurality of bits 201, 202, 203, 204, 205, 206, 207, 208, and up to 209, a decoder 290, and an input/output (I/O) circuit 292. For clarity, only 9 bits are shown in the illustrated embodiment of FIG. 2. Each bit may include a plurality of transistors (e.g., six MOSFETs for a 6T SRAM, eight MOSFETs for an 8T SRAM, etc.) to store or present a logic state (e.g., an initial logic state). In the illustrated embodiment of FIG. 2, the SRAM block 102 further includes a plurality of word lines (WL's), bit lines (BL's), and bit bar lines (BBL's). The WL's of the SRAM block 102 include 250, 260, and up to 270. Each WL is arranged along a row of the SRAM block 102, and the row includes a plurality of bits coupled to the respective WL. For example, WL 250 is arranged along row "a," and row a includes bits 201, 202, and up to 203 coupled to WL 250; WL 260 is arranged along row "b," and row b includes bits 204, 205, and up to 206 coupled to WL 260; WL 270 is arranged along row "c," and row c includes bits 207, 208, and up to 209 coupled to WL 270. The BL's of the SRAM block 102 include 220, 230, and up to 240. The BBL's of the SRAM block 102 include 222, 232, and up to 242. Each pair of a BL and BBL is arranged along a column of the SRAM block 102 and the column includes a plurality of bits coupled to the respective pair of BL and BBL. For example, BL 220 and BBL 222 are arranged along column "A," and column A includes bits 201, 204, and up to 207 coupled to both BL 220 and BBL 222; BL 230 and BBL 232 are arranged along column "B," and column B includes bits 202, 205, and up to 208 coupled to both BL 230 and BBL 232; BL 240 and BBL 242 are arranged along column "C," and column C includes bits 203, 206, and up to 209 coupled to both BL 240 and BBL 242. Further, as shown in FIG. 2, each of the bits of the SRAM block 102 is coupled to and powered by a supplied voltage, hereinafter "Vcc." In some embodiments, the start-up circuit 108 iteratively provides and withdraws Vcc from each bit of the SRAM block 102 so as to power on and off the SRAM block 102, respectively, in response to the request received from input port 101 (FIG. 1), which will be further discussed below.

As described above, each bit of the SRAM block 102 is configured to present/store a data state. In some embodiments, every time the SRAM block 102 is powered up, each bit presents an initial state. Referring still to FIG. 2, in some embodiments, the initial states of the bits of the SRAM block 102 may be read out by the I/O circuit 292. More specifically, the decoder 290 is configured to select a first row of the bits (of the SRAM block 102) to be read by asserting a corresponding WL, and the I/O circuit 292 then reads out the initial states of the bits along the first row through its corresponding BL's and BBL's. Subsequently, the decoder 290 is configured to select a second row of the bits (of the SRAM block 102) to be read by asserting a corresponding WL (a different WL), and the I/O circuit 292 then reads out the initial states of the bits along the second row through its corresponding BL's and BBL's. In some embodiments, the row decoder 290 may continue to select one or more further rows of bits to be read by the I/O circuit 292 by asserting one or more corresponding (different) WL's until the initial states of all the bits across the SRAM block 102 are read out through respective BL's and BBL's.

In some embodiments, the decoder 290 and the I/O circuit 292 of the SRAM block 102 may follow the above-described procedures to "write" data states to the bits of the SRAM block 102. For example, the decoder 290 selects a first row of the bits to be written by asserting a corresponding WL, and the I/O circuit 292 writes either a logic 1 or a logic 0 to each of the bits along the first row through each bit's coupled BL and/or BBL. Subsequently, the decoder 290 selects a second row of the bits to be written by asserting a corresponding WL, and the I/O circuit 292 writes either a logic 1 or a logic 0 to each of the bits along the second row through each bit's coupled BL and/or BBL.

As described above, the initial state of an unstable bit is non-repeatable. In other words, an unstable bit of an SRAM block (e.g., 102) presents its initial state sometimes as a logic 1 and sometimes as a logic 0. Even though the initial state of the unstable bit may change every time the SRAM block is powered on, after powering on (and off) the SRAM block several times, the initial state of the unstable bit may show a tendency, i.e., either a tendency to a logic 1 or a tendency to a logic 0. In an example in which an SRAM block is powered on and off for five times, an unstable bit in the SRAM block may present a logic 0 for three of the five times, and may present a logic 1 for two of the five times. As such, the unstable bit in the SRAM block may be referred to as having a tendency to a logic 0, which can be deemed its "majority" initial state. On the other hand, since the initial state of a stable bit is repeatable and consistent, the "majority" initial state of the stable bit need not be elected. In accordance with various embodiments, the election engine 106 of the authentication circuit 104 utilizes the above-described principle to determine a tendency of each unstable bit in the SRAM block 102 so as to determine the "majority" initial states of the unstable bits and then uses the majority initial states of unstable bits and initial states of stable bits to generate a PUF signature. Exemplary operations of the election engine 106 (and the authentication circuit 104) will be described in further detail below with respect to FIG. 3.

Figure 3:
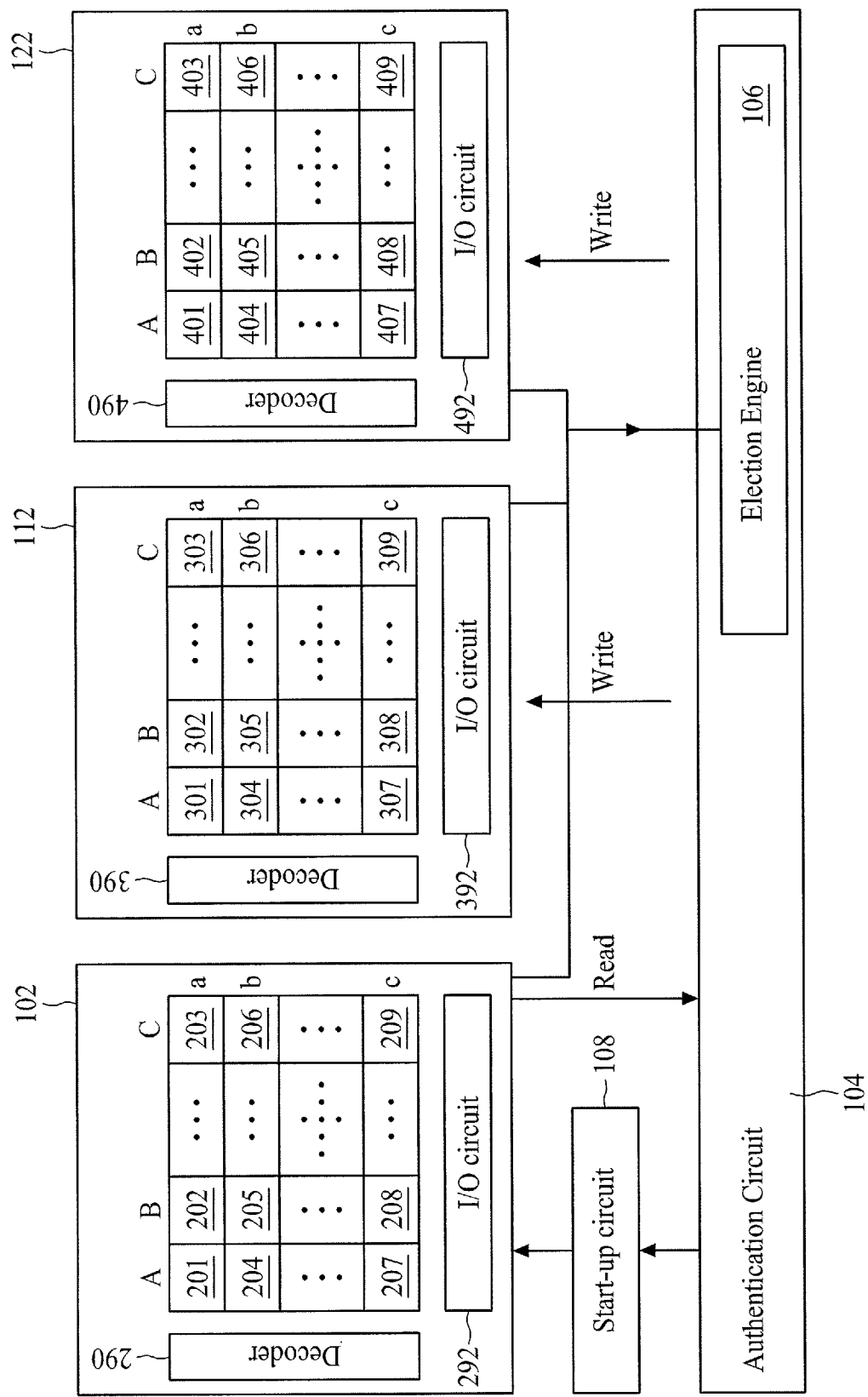
FIG. 3 is an exemplary schematic diagram illustrating an operation of the election engine of FIG. 1, in accordance with some embodiments.

FIG. 3 is an exemplary schematic diagram illustrating the operation of the memory device 100 to generate a PUF signature using the initial states of stable bits and the majority initial states of unstable bits in the SRAM block 102, in accordance with various embodiments. One or more operations discussed in FIG. 3 are performed by the components in FIGS. 1 and 2, and thus the numerals of components in FIGS. 1 and 2 are used interchangeably in FIG. 3. The illustrated embodiment of FIG. 3 is merely an example so that any of a variety of operations may be omitted, re-sequenced, and/or added while remaining within the scope of the present disclosure.

As shown in the illustrated embodiment of FIG. 3, the authentication circuit 104 receives a request 101. In response to the reception of the request 101, the authentication circuit 104 causes the start-up circuit 108 to power up the SRAM block 102. As described above, each bit of the SRAM block 102 is applied with the Vcc, i.e., powered on, so that each bit of the SRAM block presents an initial state (hereinafter "first set of initial states" of the SRAM block 102).

For clarity, only bits 201, 202, 203, 204, 205, 206, 207, 208, and 209, the decoder 290, and the I/O circuit 292 are shown in the illustrated embodiment of the SRAM block 102 in FIG. 3, i.e., WL's (250, 260, 270, etc.), BL's (220, 230, 240, etc.), and BBL's (222, 232, 242, etc.) are omitted for clarity of illustration. As described above, each of the reproduced SRAM blocks (112, 122, and 132) is identical to the SRAM block 102. Taking the reproduced SRAM blocks 112 and 122 as examples, the reproduced SRAM block 112 also includes bits 301, 302, 303, 304, 305, 306, 307, 308, and 309 wherein bits 301, 302, 303 are arranged along row a and at columns A, B, and C, respectively; bits 304, 305, 306 are arranged along row b and at columns A, B, and C, respectively; bits 307, 308, 309 are arranged along row c and at columns A, B, and C, respectively. Moreover, the reproduced SRAM block 112 also includes decoder 390 and I/O circuit 392 that have similar functionalities to the decoder 290 and the I/O circuit 292 of the SRAM block 102, respectively. The reproduced SRAM block 122 also includes bits 401, 402, 403, 404, 405, 406, 407, 408, and 409 wherein bits 401, 402, 403 are arranged along row a and at columns A, B, and C, respectively; bits 404, 405, 406 are arranged along row b and at columns A, B, and C, respectively; and bits 407, 408, 409 are arranged along row c and at columns A, B, and C, respectively. Moreover, the reproduced SRAM block 122 also includes decoder 490 and I/O circuit 492 that have similar functionalities to the decoder 290 and the I/O circuit 292 of the SRAM block 102, respectively. Also for the purpose of clarity, only bits 301, 302, 303, 304, 305, 306, 307, 308, and 309, the decoder 390, and the I/O circuit 392 are shown, and only bits 401, 402, 403, 404, 405, 406, 407, 408, and 409, the decoder 490, and the I/O circuit 492 are shown in the illustrated embodiments of the reproduced SRAM blocks 112 and 122, respectively, in FIG. 3.

In some embodiments, the initial states of all the bits of the SRAM block 102, i.e., the first set of initial states, are read out by the I/O circuit 292 and the first set of initial states is written to the SRAM block 112 by the I/O circuit 392 of the SRAM block 112. More specifically, in some embodiments, the authentication circuit 104 causes the decoder 290 to select a row of the SRAM block 102 to be read, the I/O circuit 292 accordingly reads the initial states of bits in the selected row of the SRAM block 102, the authentication circuit 104 receives the initial states of bits and thereafter causes the decoder 390 of the SRAM block 112 to select a row in the SRAM block 112 that corresponds to the selected row of the SRAM block 102. The authentication circuit 104 then provides the initial states of bits of the selected row of the SRAM block 102 to each of the respective bits in the corresponding row of the SRAM block 112. For example, the authentication circuit 104 causes the decoder 290 to select row "a" to be read. Accordingly, the initial states of the bits (201, 203, 203, etc.) along row "a" are read out by the I/O circuit 292. The authentication circuit 104 receives the read-out initial states of the bits (201, 203, 203, etc.) along row a from the I/O circuit 292 of the SRAM block 102, and then provides such read-out initial states to the I/O circuit 392 of the SRAM block 112. The authentication circuit 104 causes the decoder 390 to select row a of the SRAM block 112 (i.e., the row in the SRAM block 112 corresponding to row a in the SRAM bock 102) to be written. i.e., bits 301, 302, and up to 303. Upon row a of the SRAM block 112 being selected, each of the bits along row a of the SRAM block 112 (bits 301, 302, and 303) is written with a data state that is identical to the read-out initial state of the corresponding bit along row a of the SRAM block 102, i.e., the bits 201, 202, and 203. In other words, the data state written to the bit 301 is identical to the (read-out/present) initial state at the bit 201; the data state written to the bit 302 is identical to the (read-out/present) initial state at the bit 202; the data state written to the bit 303 is identical to the (read-out/present) initial state at the bit 203; etc.

Following the above-described operations, the initial states of bits along further rows of the SRAM block 102 are read out and written (i.e., copied) to corresponding bits (i.e., bits on the corresponding row) of the SRAM block 112. Consequently, in some embodiments, the first set of initial states of the SRAM block 102 is copied to the reproduced SRAM block 112. For example, initial states of the bits along row b of the SRAM block 102 (bits 204, 205, and up to 206) are copied to the bits along row b of the SRAM block 112 (bits 304, 305, and up to 306), respectively; initial states of the bits along row c of the SRAM block 102 (bits 207, 208, and up to 209) are copied to the bits along row c of the SRAM block 112 (bits 307, 308, and up to 309), respectively.

In order to elect the majority initial state of each bit of the SRAM block 102, according to some embodiments of the present disclosure, at least two sets of initial states of all the bits of the SRAM block 102 that are respectively copied to two reproduced SRAM blocks will be used by the election engine 106 for the election. In this regard, the authentication circuit 104 may cause the start-up circuit 108 to power off the SRAM block 102, and subsequently power on the SRAM block 102 again. After the SRAM block 102 is re-powered on, in some embodiments, at least part of the bits (e.g., the unstable bits) of the SRAM block 102 may each present another initial state. Accordingly, the initial states present at all the bits of the SRAM block 102 after the second time of powering on are referred to as "second set of initial states" of the SRAM block 102. The second set of initial states are copied to a second reproduced SRAM block 122 in similar fashion to the operations described above with respect to the first reproduced SRAM block 112.

In some embodiments, the authentication circuit 104 may cause the start-up circuit 108 to power off the SRAM block 102 yet again, and subsequently power on the SRAM block 102. After the SRAM block 102 is re-powered on, at least part of the bits of the SRAM block 102 may each present another initial state. Accordingly, the initial states present at all the bits of the SRAM block 102 after the third time of powering on are referred to as a "third set of initial states" of the SRAM block 102. In some embodiments, the authentication circuit 104 need not copy the third set of initial states to another reproduced SRAM block, since the third set of initial states are retained within SRAM block 102, and the election engine 106 uses the three sets of initial states (in the SRAM block 102, the reproduced SRAM blocks 112 and 122) as electives to determine the majority initial states for the SRAM block 102. In some other embodiments, the authentication circuit 104 may copy the third set of initial states to another reproduced SRAM block (e.g., 132 in FIG. 1) and the election engine 106 uses the three sets of initial states (in the reproduced SRAM blocks 112, 122, and 132) as electives to determine the majority initial states for the SRAM block 102. Still in some other embodiments, the authentication circuit 104 may cause the start-up circuit 108 to iteratively power on and off to cause the SRAM block 102 to present one or more sets of initial states. As such, the memory device 100 may include one or more additional reproduced SRAM blocks to which the one or more sets of initial states are to be copied so as to provide the election engine 106 more electives.

In the specific embodiment of three sets of initial states that are present in the SRAM block 102, and the reproduced SRAM block 112 and 122, respectively, the election engine 106 reads the initial states for each bit from the three sets of initial states, and then elects the logic state that is present more than twice as the majority initial state of that bit. For example, if the initial state (the third set) present at the SRAM block 102 for the bit 201 is a logic 1, the initial state (the first set) present/written at the bit 301 of the SRAM block 112 is a logic 1, and the initial state (the second set) present/written at the bit 401 of the SRAM block 122 is a logic 0, then the election engine 106 may elect the logic 1 as the majority initial state for the bit 201. In an example of a total five sets of initial states being generated, the election engine 106 may read the initial states for each bit from the five sets of initial states and elect the logic state that is present three or more times as the majority initial state for that bit. Generally, the election engine 106 may read the initial states for each bit from N sets of initial states, where N is an odd integer greater than 1, and elect the logic state that is present (N+1)/2 or more times (i.e., more than half) out of the N sets of initial states, as the bit's majority initial state.

As described above, in some embodiments, the start-up circuit 108 may iteratively power on and off (hereinafter "a power cycle") the SRAM block 102 every time a new set of initial states is to be copied. In this regard, the memory device 100 in the present disclosure provides some embodiments of the start-up circuit 108 that can provide the iterative power cycles.

Figure 4A:
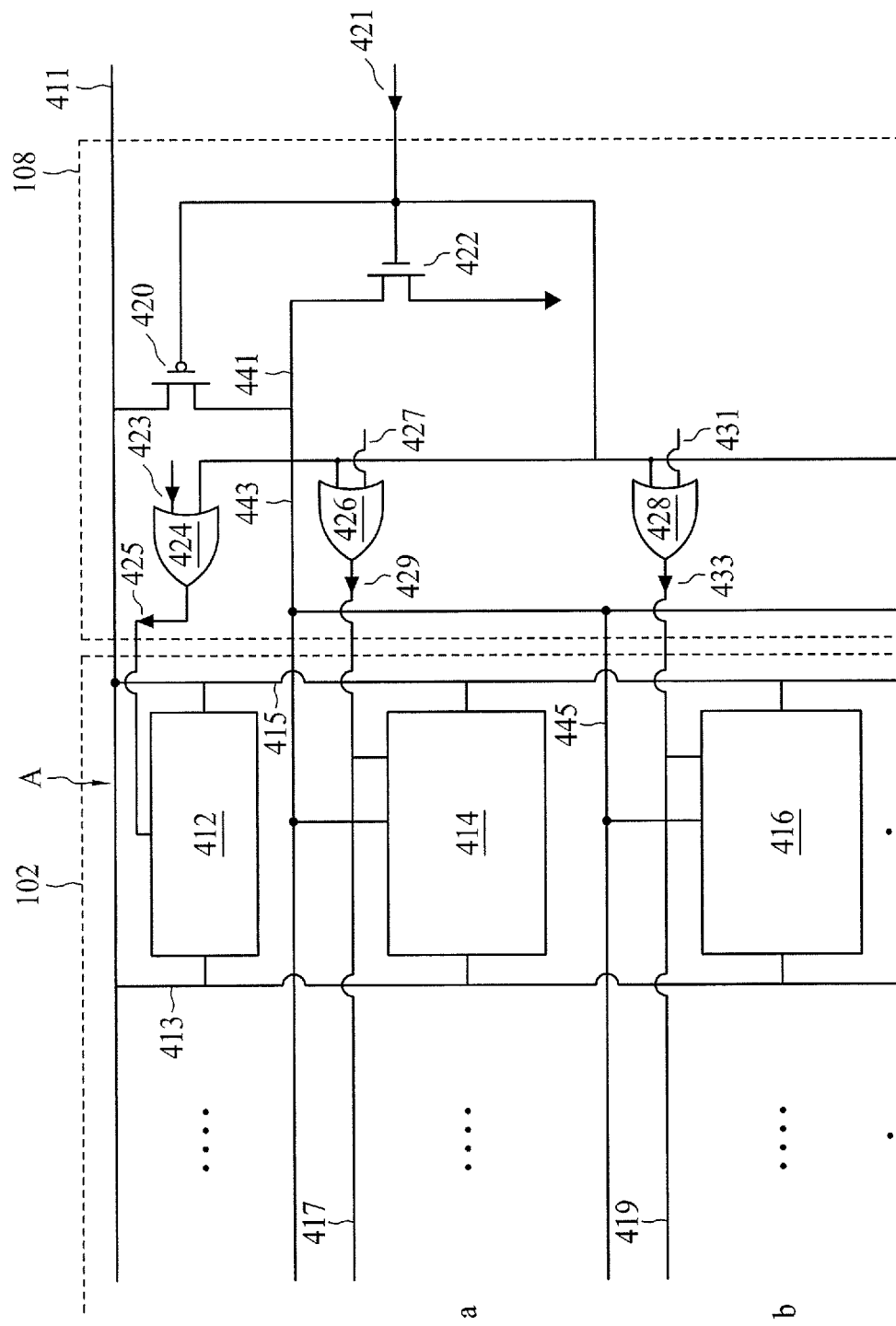
FIG. 4A illustrates an exemplary schematic diagram illustrating part of a static random-access memory (SRAM) block and part of a start-up circuit of the memory device of FIG. 1, in accordance with some embodiments.
Figure 4B:
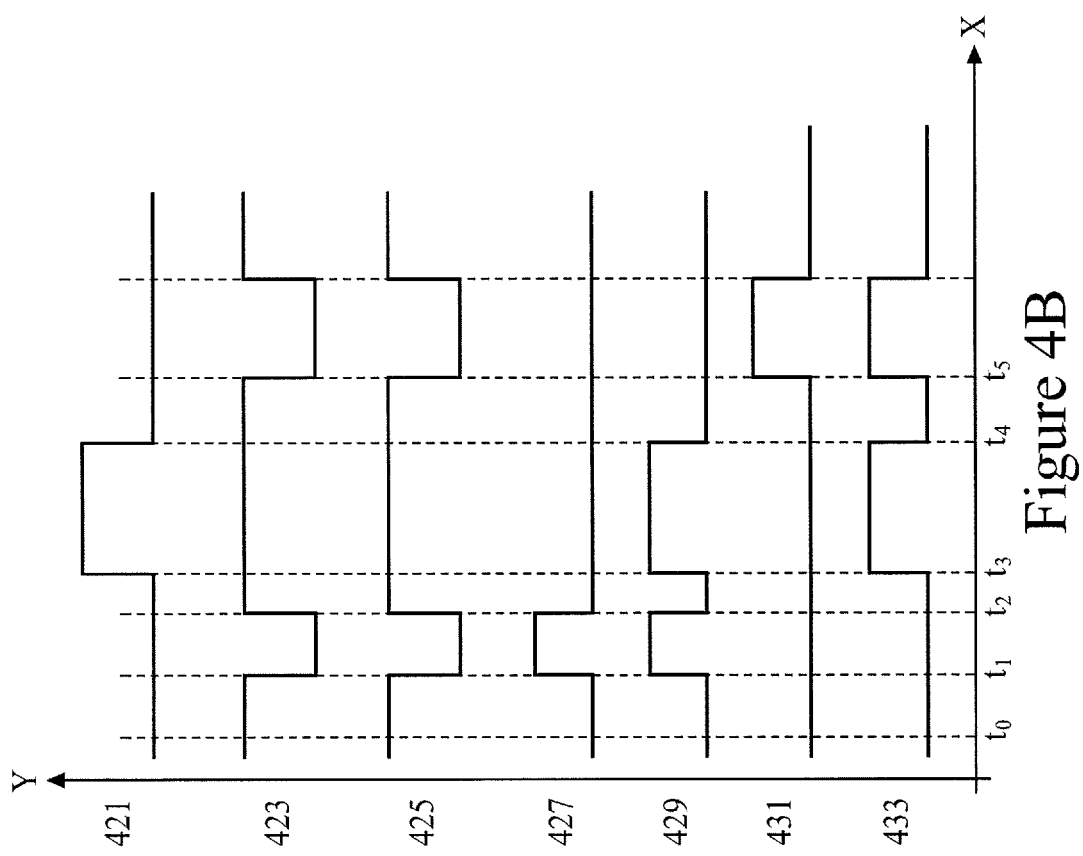
FIG. 4B illustrates exemplary waveforms of signals to operate the start-up circuit of FIG. 4A, in accordance with some embodiments.

Referring now to FIGS. 4A and 4B, FIG. 4A is an exemplary schematic diagram illustrating part of the SRAM block 102 (FIG. 1) and part of the start-up circuit 108 (FIG. 1), in accordance with various embodiments. Since FIG. 4A is provided for the purpose of illustration, only part of the SRAM block 102 (1 column and 2 rows) and part of the start-up circuit 108 (corresponding to the partially shown SRAM block 102) are illustrated in FIG. 4A. FIG. 4B illustrates exemplary waveforms of signals to operate the SRAM block 102 and start-up circuit 108 of FIG. 4A, in accordance with various embodiments.

In the illustrated embodiment of FIG. 4A, the SRAM block 102 includes a pre-charge circuit 412, a first bit (or cell) 414, and a second bit (or cell) 416. Still in some embodiments, the embodiment of the SRAM block 102 in FIG. 4A is substantially similar to the embodiment with respect to FIG. 2. That is, bits are arranged in a column-row configuration; each column has a bit line (BL) and/or a bit bar line (BBL) coupled to the bits arranged in that column; each row has a word line (WL) coupled to the bits arranged in that row. As described above, only two rows and one column are shown in FIG. 4A, and thus only two bits 414 and 416 are shown. The SRAM block 102 of FIG. 4A may include any desired number of columns and rows, and each column/row may include any desired number of bits while remaining within the scope of the present disclosure. More specifically in the embodiment of FIG. 4A, the first and second bits, 414 and 416, are arranged at the same column, column A, which includes BL 413 and BBL 415 coupled to the bits 414 and 416, respectively. Further, in this specific embodiment of FIG. 4A, the pre-charge circuit 412 is disposed at column A as well. The pre-charge circuit 412 is coupled to the bits 414 and 416 through the BL 403 and BBL 405. The pre-charge circuit 412 is configured to receive pre-charge control signal 425 so as to pre-charge the BL 413 and BBL 415 to a voltage level of supplied voltage 411 (e.g., Vcc) before a logic state (e.g., an initial logic state) is read out from the bit, which will be discussed in further detail below. In some alternative embodiments, the pre-charge circuit 412 may be implemented as a "discharge" circuit that is configured to discharge the BL 413 and BBL 415 to ground before a logic state (e.g., an initial logic state) is read out from the bit.

Referring still to FIG. 4A, the start-up circuit 108 includes a first transistor 420, a second transistor 422, a first logic gate 424, a second logic gate 426, and a third logic gate 428. In some embodiments, the first logic gate 424 is configured to control the pre-charge circuit 412; the second logic gate 426 is configured to control the bit 414; the third logic gate 428 is configured to control the bit 416, and thus, accordingly, only three logic gates are shown in FIG. 4A. Following the embodiment in which the SRAM block 102 includes more columns/rows (i.e., 2 rows and 1 column), the start-up circuit 108 may include any corresponding number of logic gates while remaining within the scope of the present disclosure. In some embodiments, the first transistor 420 is a p-type metal-oxide-semiconductor (PMOS) transistor, the second transistor 422 is an n-type metal-oxide-semiconductor (NMOS) transistor, and the first, second, and third logic gates are OR gates. In some other embodiments, the first and second transistors 420 and 422 may be respectively any of a variety of transistors, for example, a bipolar junction transistor (BJT), a high-electron mobility transistor (HEMT), a silicon-on-insulator (SOI) transistor, etc., that are suitable to perform a switching function, as will be described below.

In the embodiment illustrated in FIG. 4A, the source of the first transistor 420 is coupled to the supplied voltage 411, the gate of the first transistor 420 is coupled to a power signal line that is configured to receive a power signal 421, the drain of the first transistor 420 is coupled to the drain of the second transistor 422 at a common node 441, the gate of the second transistor 422 is also coupled to the power signal line that is configured to receive the power signal 421, and the source of the second transistor 422 is coupled to ground. The common node 441 is coupled to at least two virtual supplied voltage (VSV) lines 443 and 445. The VSV lines 443 and 445 are coupled to the bits 404 and 406, respectively. In some embodiments, each of the OR logic gates, 424, 426, and 428, is configured to receive two input signals, and performs an OR function, as shown in Table 1, on the respective two input signals, to provide an output signal.

TABLE 1

| Input 1 | Input 2 | Output |
|---------|---------|--------|
| 0 | 0 | 0 |
| 1 | 1 | 1 |
| 0 | 1 | 1 |
| 1 | 0 | 1 |

In the illustrated embodiment of FIG. 4A, OR logic gate 424 is configured to OR (i.e., perform the OR function) a pre-charge signal 423 and the power signal 421 so as to provide the pre-charge control signal 425 (i.e., an OR'd signal) to the pre-charge circuit 412; OR logic gate 426 is configured to OR a WL signal 427 and the power signal 421 so as to provide a WL assertion signal 429 (i.e., an OR'd signal) to the bit 414; OR logic gate 428 is configured to OR a WL signal 431 and the power signal 421 so as to provide a WL assertion signal 433 (i.e., an OR'd signal) to the bit 416. In some embodiments, the power signal 421 and the pre-charge signal 423 may be received from the authentication circuit 104.

Referring now to FIG. 4B, waveforms of the power signal 421, the pre-charge signal 423, the pre-charge control signal 425, the WL signal 427, and the WL assertion signal 429 are illustrated, respectively, in accordance with various embodiments. In the illustrated embodiment of FIG. 4B, each of the waveforms (signals) varies between a logic high state, hereinafter "high," and a logic low state, hereinafter "low," (along the Y axis in FIG. 4B) over time (along the X axis in FIG. 4B).

Starting from "t0," the power signal 421 is at low; the WL signals 427 and 431 are at low; the pre-charge signal 423 is at high. Consequently, using the truth table of OR function in Table 2, the pre-charge control signal 425 (i.e., OR'ing signals 421 and 423) is at high; the WL assertion signals 429 and 433 (i.e., OR'ing signals 421 and 427 and OR'ing signals 421 and 431, respectively) are at low. When the power signal 421 is at low, the first transistor 420 is on and the second transistor 422 is off. As such, the first transistor 420 couples the supplied voltage 411 (Vcc) to the VSV lines 443 and 445 so as to provide the Vcc (i.e., power) to the bits 414 and 416. That is, the bits 414 and 416 are powered on. When the pre-charge control signal 425 is at high, in this specific embodiment, the pre-charge circuit 412 is deactivated. Accordingly, the pre-charge circuit 412 does not couple (pre-charge) the supplied voltage (Vcc) to the BL 413 and BBL 415. That is, the BL 413 and BBL 415 are not pre-charged. When the WL assertion signal 429 is at low, the WL 417 is not asserted, which means that the bit 414 is not selected (despite being powered on). Similarly, when the WL assertion signal 433 is at low, the WL 419 is not asserted, which means that the bit 406 is not selected (despite being powered on). Thus, at t0, the bits 414 and 416 are ON. As described above, when a bit (of an SRAM block) is powered on, the bit may present a logic state, which is the initial logic state. In some embodiments, the bits 414 and 416 may present an initial logic state, respectively.

Continuing to time "t1," the power signal 421 remains at low; the pre-charge signal 423 transitions from high to low; the WL signal 427 transitions from low to high. Consequently, using the truth table of OR function in Table 2, the pre-charge control signal 425 (i.e., OR'ing signals 421 and 423) transitions from high to low; the WL assertion signals 429 (i.e., OR'ing signals 421 and 427) transitions from low to high; the WL assertion signal 433 (i.e., OR'ing signals 421 and 431) remains at low. When the pre-charge control signal 425 transitions from high to low, the pre-charge circuit 412 is activated. Accordingly, the pre-charge circuit 412 is configured to pre-charge the BL 413 and BBL 415 to the Vcc (i.e., the supplied voltage 411). When WL assertion signal 429 transitions from low to high, the WL 417 is at high, which means that row a is selected and so are the bits along row a (i.e., bit 414). Thus, at t1, the initial logic state of bit 414 can be read by the I/O circuit 292 (FIG. 2). And such read initial logic state of bit 414 may be further copied by the authentication circuit 104 and elected by the election engine 106, as described above.

Continuing to time "t2," the power signal 421 remains at low; the pre-charge signal 423 transitions from low to high; the WL signal 427 transitions from high to low; the WL signal 431 remains at low. Consequently, using the truth table of OR function in Table 2, the pre-charge control signal 425 (i.e., OR'ing signals 421 and 423) transitions from low to high; the WL assertion signals 429 (i.e., OR'ing signals 421 and 427) transitions from high to low; the WL assertion signal 433 (i.e., OR'ing signals 421 and 431) remains at low. When the pre-charge control signal 425 transitions from low to high, the pre-charge circuit 412 is deactivated again. Accordingly, the pre-charge circuit 412 is configured to decouple the BL 413 and BBL 415 from the Vcc. When WL assertion signal 429 transitions from high to low, the WL 417 transitions to low again, which means that row a is non-selected and so are the bits along row a (i.e., bit 414). Accordingly, the initial logic state of bit 414 is not able to be read by I/O circuit 292.

Continuing to time "t3," the power signal 421 transitions from low to high; the pre-charge signal 423 remains at high; the WL signals 427 and 431 remain at low. Consequently, using the truth table of OR function in Table 1, the pre-charge control signal 425 (i.e., OR'ing signals 421 and 423) remains at low; the WL assertion signals 429 (i.e., OR'ing signals 421 and 427) transitions from low to high; the WL assertion signal 433 (i.e., OR'ing signals 421 and 431)

transitions from low to high. When the power signal 421 transitions from low to high, the first transistor 420 is turned off and the second transistor 422 is turned on. As such, the VSV lines 443 and 445 are decoupled from the Vcc (i.e., power) and coupled to ground. That is, the bits 414 and 416 are powered off. Also, as described above, when the WL assertion signals 429 and 433 are at high, the WL's 417 and 419 are asserted, respectively.

Due to a presence of one or more parasitic capacitances in the SRAM block 102, a bit of the SRAM block 102 may be powered on again before the bit is fully discharged (powered off), which may disadvantageously affect the reliability and repeatability initial state of the bit. More specifically, when the one or more parasitic capacitances are not fully discharged, electric charges present within the parasitic capacitances may disadvantageously flow back to the bits of the SRAM block 102 when the SRAM block 102 is powered on again. The decoupled VSV lines 443 and 445, the deactivated pre-charge circuit 412, and the asserted WL's 417 and 419 (at t3) may assure that the one or more parasitic capacitances are fully discharged during a power-off phase (from t3 to t4) so the disclosed memory device 100 are not subjected to the above-identified issue. When the VSV lines 443 and 445 are decoupled from the Vcc and coupled to ground, not only are the bits 414 and 416 turned off but also the one or more parasitic capacitances in the SRAM block 102 are discharged. When the pre-charge circuit 412 is deactivated, a conductive path (a leakage path) between the one or more parasitic capacitances in the SRAM block 102 and the Vcc is also disconnected. When the WL's 417 and 419 are asserted (activated), the activated WL may serve as a discharging path for the electric charges present within the parasitic capacitances to be discharged.

Continuing to time "t4," the power signal 421 transitions from high to low; the pre-charge signal 423 remains at high; the WL signals 427 and 431 remain at low. Consequently, using the truth table of OR function in Table 2, the pre-charge control signal 425 (i.e., OR'ing signals 421 and 423) remains at high; the WL assertion signals 429 (i.e., OR'ing signals 421 and 427) transitions from high to low; the WL assertion signal 433 (i.e., OR'ing signals 421 and 431) transitions from high to low. Consequently, the bits 414 and 416 are powered on again but the pre-charge circuit 412, WL's 417 and 419 are deactivated, as similar to t2.

In some embodiments, at t5, the WL signal 431 transitions from low to high and the pre-charge signal 423 transitions from high to low while the power signal 421 remains at low and the WL signal 427 remains at low. As such, the WL assertion signal 433 transitions from low to high, and the pre-charge control signal 425 transitions from high to low, which may cause the pre-charge circuit 412 to pre-charge the BL 413 and BBL 415 and the WL 419 to be asserted, thereby enabling the authentication circuit 104 to read the initial logic state present at the bit 416 (and other bits along row b, which are not shown in FIG. 4A).

Figure 5:
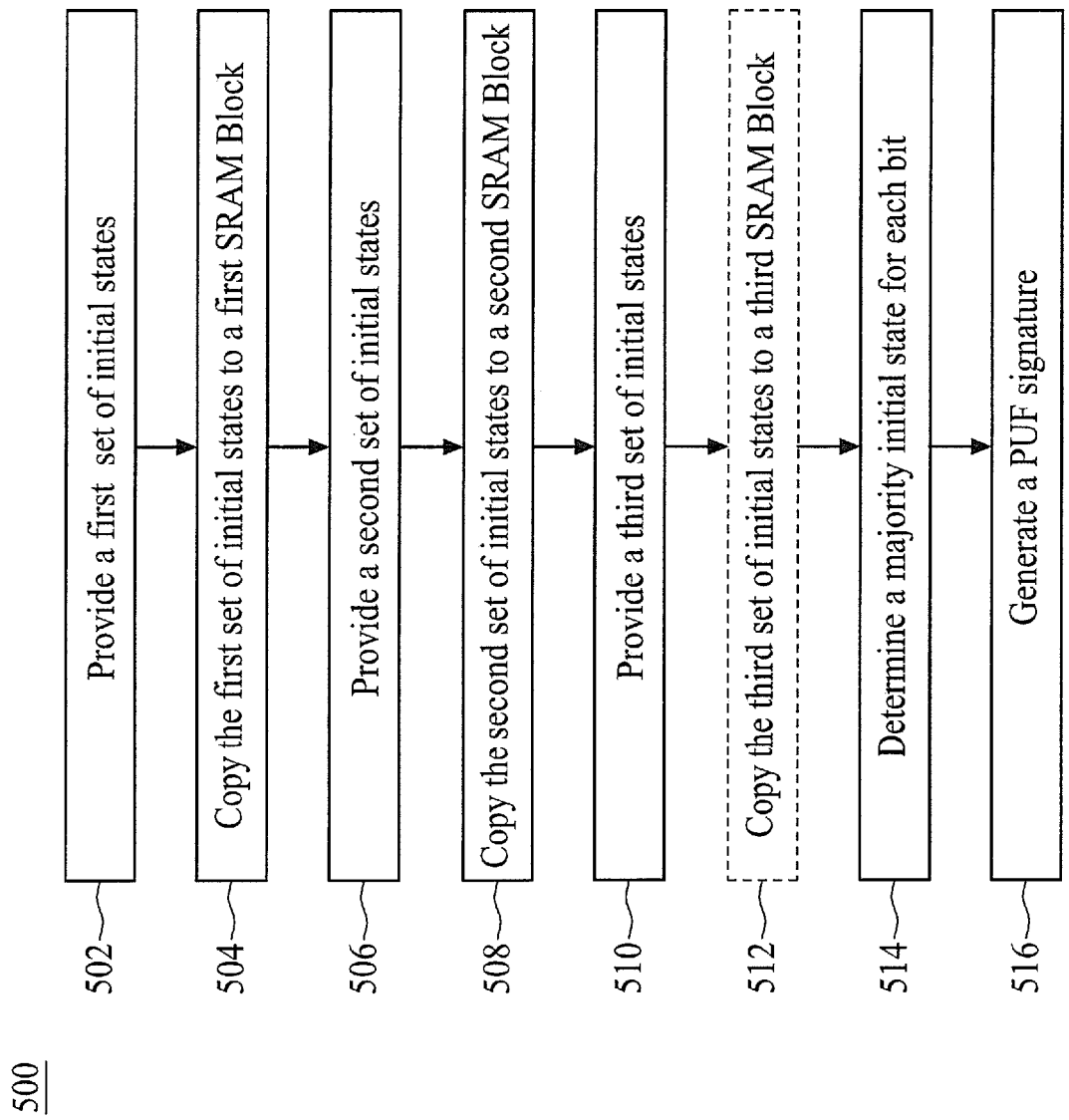
FIG. 5 illustrates an exemplary flow chart of a method of generating a physically unclonable function (PUF) signature for the memory device of FIG. 1, in accordance with various embodiments.

FIG. 5 illustrates an exemplary flow chart of a method 500 of generating a physically unclonable function (PUF) signature, by the authentication circuit 104, for the SRAM block 102 in accordance with some embodiments. In various embodiments, the method 500 is performed by at least one of the components described in FIGS. 1-4. For purposes of discussion, the following embodiment of the method 500 will be described in conjunction with FIGS. 1-4. The illustrated embodiment of the method 500 is merely an example so that any of a variety of operations may be omitted, re-sequenced, and/or added while remaining within the scope of the present disclosure.

The method 500 starts with operation 502 in which a first set of initial states is provided. More specifically, an SRAM block that includes a plurality of bits is powered on and each of the bits presents an initial state. The initial states of all the bits of the SRAM block are referred to as the "first set of initial states." For example, referring again to FIGS. 1 and 2, when the SRAM block 102 is powered on, each bits (e.g., 201, 202, 203, 204, 205, 206, 207, 208, 209, etc.) presents an initial state.

The method 500 continues to operation 504 in which the first set of initial states is copied to a first reproduced SRAM block. Continuing with the above example, but referring to FIG. 3, the first set of initial states present at the SRAM block 102 is copied to the reproduced SRAM block 112. More specifically, in some embodiments, the first set of initial states may be first read out by the authentication circuit 104 and written to the reproduced SRAM block 112.

The method 500 continues to operation 506 in which a second set of initial states of the SRAM block is provided. Using the same example, in some embodiments, the SRAM block 102 is powered down and then on by the start-up circuit 108. As such, at least part of the bits of the SRAM block 102 may present another initial state. The initial states of all the bits of the SRAM block 102 after the first powering off and on are referred to as the "second set of initial states."

The method 500 then proceeds to operation 508 in which the second set of initial states is copied to a second reproduced SRAM block. Continuing with the above example, referring again to FIG. 3, the second set of initial states present at the SRAM block 102 (after the first powering off and on) is copied to the reproduced SRAM block 122. More specifically, in some embodiments, the second set of initial states may be first read out by the authentication circuit 104 and written to the reproduced SRAM block 122.

The method 500 continues to operation 510 in which a third set of initial states of the SRAM block is provided. In the above example, the SRAM block 102 is powered down and then on by the start-up circuit 108. As such, at least part of the bits of the SRAM block 102 may present still another initial state. The initial states of all the bits of the SRAM block 102 after the second powering off and on are referred to as the "third set of initial states." The method 500 may optionally continue to operation 512 in which the third set of initial states is copied to still another reproduced SRAM block (e.g., 132 in FIG. 1).

In some embodiments, upon at least three sets of initial states are respectively present/stored in three different SRAM blocks or reproduced SRAM blocks, the method 500 continues to operation 514 in which the election engine 106 of the authentication circuit 104 elects the majority initial state of each bit of the SRAM block 102 by examining each bit's tendency, as described above. After the majority initial state for each bit of the SRAM block 102 is determined, the method 500 continues to operation 516 in which the authentication circuit 104 uses the majority initial states of the bits to generate a PUF signature.

In an embodiment, a memory device is disclosed. The memory device includes a memory block comprises a plurality of bits, wherein at least a first bit of the plurality of bits presents an initial logic state each time it is powered on; a start-up circuit configured to power on and off the memory block N times, where N is an odd integer greater than 1, and wherein the at least first bit presents an initial state after each respective power cycle of the memory block; and an authentication circuit, coupled to the memory block, and comprising an election engine that is configured to elect an initial state that occurs (N+1)/2 or more times after N power cycles that are performed by the start-up circuit, as a majority initial logic state for the first bit.

In another embodiment, a memory device includes a memory block comprises a plurality of bits, wherein the memory block is configured to be powered on N times, and wherein within the N times, at least a first bit of the plurality of bits presents a first initial logic state for N1 times and a second initial logic state, being different from the first initial logic state, for N2 times, where N is an odd integer greater than 1 and N=N1+N2; and an authentication circuit, coupled to the memory block, and comprising an election engine that is configured to elect the first initial logic state as a majority initial state for the first bit when N1 is greater than N2.

Yet in another embodiment, a method of generating a physically unclonable function (PUF) signature for a memory device is disclosed. The method includes powering on and off a memory block of the memory device N times, wherein the memory block includes a plurality of bits, and wherein N is an odd integer greater than 1; providing at least a first bit that presents an initial state after each respective powering on and off of the memory block; and electing an initial state that occurs (N+1)/2 or more times, as a majority initial logic state for the first bit.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
    a memory block comprises a plurality of bits, wherein a first bit of the plurality of bits presents an initial logic state each time it is powered on;
    a start-up circuit configured to power on and off the memory block N times, where N is an odd integer greater than 1, and wherein the first bit presents an initial state after each respective power cycle of the memory block, wherein at least a second bit of the plurality of bits presents a consistent initial logic state when the memory block is powered on plural times; and
    an authentication circuit, coupled to the memory block, and comprising an election engine that is configured to determine an initial state of the first bit each time after powering on the memory block N times, and thereafter select as a majority initial logic state for the first bit the initial state of the first bit that occurs (N+1)/2 or more times after N power cycles are performed by the start-up circuit, and
    wherein the authentication circuit is configured to generate a physically unclonable function (PUF) signature, wherein the at least the majority initial state of the first bit and the consistent initial logic state of the second bit are copied and used to generate the PUF signature.

2. The memory device of claim 1 further comprising a first reproduced memory block and a second reproduced memory block that are each substantially similar to the memory block.

3. The memory device of claim 2, wherein the first reproduced memory block is configured to store a first initial logic state of the memory block, and the second reproduced memory block is configured to store a second initial logic state of the block.

4. The memory device of claim 2, wherein the authentication circuit is configured to read the first initial logic state from the memory block and write the first initial logic state to the first reproduced memory block, and read the second initial logic state from the memory block and write the second initial logic state to the second reproduced memory block.

5. The memory device of claim 1, wherein the memory block includes a static random access memory (SRAM) block.

6. The memory device of claim 1 further comprising:
    a decoder circuit configured to select a row of the memory block containing the first and second bits.

7. The memory device of claim 6, further comprising:
    an input/output (I/O) circuit configured to read bits of the row of the memory block selected by the decoder circuit, wherein the initial logic states of the read bits are stored in a reproduced memory block.

8. A memory device, comprising:
    a memory block comprises a plurality of bits, wherein the memory block is configured to be powered on N times, and wherein within the N times, a first bit of the plurality of bits presents a first initial logic state for N1 times and a second initial logic state, being different from the first initial logic state, for N2 times, where N is an odd integer greater than 1 and N=N1+N2, and wherein at least a second bit of the plurality of bits presents a consistent initial logic state over the N times of powering on the memory block; and
    an authentication circuit, coupled to the memory block, and comprising an election engine that is configured to determine the initial logic state of the first bit each time after powering on the memory block N times, and thereafter select as a majority initial state for the first bit the first initial logic state when N1 is greater than N2, and
    wherein the authentication circuit is configured to generate a physically unclonable function (PUF) signature, wherein the at least the majority initial state of the first bit and the consistent initial logic state of the second bit are copied and used to generate the PUF signature.

9. The memory device of claim 8, further comprising a start-up circuit that is configured to power on the memory block.

10. The memory device of claim 8, further comprising a plurality of reproduced memory blocks that are each substantially similar to the memory block.

11. The memory device of claim 10, wherein each of the reproduced memory blocks is configured to store either the first initial logic state or the second initial logic state every time the memory block is powered on.

12. The memory device of claim 11, wherein every time the memory block is powered on, the authentication circuit is configured to copy either the first initial logic state or the second initial logic state from the first bit to one of the reproduced memory blocks.

13. The memory device of claim 8, wherein the memory block includes a static random access memory (SRAM) block.

14. The memory device of claim 8 further comprising:
    a decoder circuit configured to select a row of the memory block containing the first and second bits.

15. The memory device of claim 14, further comprising:
an input/output (I/O) circuit configured to read bits of the row of the memory block selected by the decoder circuit, wherein the initial logic states of the read bits are stored in a reproduced memory block.

16. A method of generating a physically unclonable function (PUF) signature for a memory device, comprising:
powering on and off a memory block of the memory device N times, wherein the memory block includes a plurality of bits, and wherein N is an odd integer greater than 1, and wherein a first bit of the plurality of bits presents an initial state after each respective powering on and off of the memory block and a second bit of the plurality of bits presents a consistent initial logic state over the N times of powering on the memory block;
determining an initial state of the first bit each time after powering on the memory block N times;
selecting as a majority initial logic state for the first bit the initial state of the first bit that occurs (N+1)/2 or more times after N power cycles; and
generating a physically unclonable function (PUF) signature, wherein the at least the majority initial state of the first bit and the consistent initial logic state of the second bit are copied and used to generate the PUF signature.

17. The method of claim 16, further comprising:
copying the first initial logic state of the first bit to a first reproduced memory block that is substantially similar to the memory block.

18. The method of claim 16 further comprising:
selecting a row of the memory block containing the first and second bits.

19. The method of claim 18, further comprising:
reading bits of the row of the memory block selected by the decoder circuit; and
storing initial logic states of the read bits in a reproduced memory block.

20. The method of claim 19, wherein the PUF signature is generated based on the initial logic states of the read bits, including the majority initial logic state of the first bit and the consistent initial logic of the second bit.

* * * * *